United States Patent
Juenger

(10) Patent No.: US 6,894,691 B2
(45) Date of Patent: May 17, 2005

(54) DYNAMIC SWITCHING OF PARALLEL TERMINATION FOR POWER MANAGEMENT WITH DDR MEMORY

(75) Inventor: Randall E. Juenger, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 243 days.

(21) Appl. No.: 10/136,067

(22) Filed: May 1, 2002

(65) Prior Publication Data

US 2003/0206164 A1 Nov. 6, 2003

(51) Int. Cl.$^7$ .............................. G09G 5/39; H03K 17/16
(52) U.S. Cl. ...................... 345/531; 345/503; 345/545; 713/320; 365/226; 326/30
(58) Field of Search ................................. 345/501, 503, 345/520, 531, 533, 534, 545; 713/320, 322; 365/227, 226; 326/21, 30

(56) References Cited

U.S. PATENT DOCUMENTS

| | | | | |
|---|---|---|---|---|
| 6,215,686 B1 | * | 4/2001 | Deneroff et al. ............... | 365/52 |
| 6,347,367 B1 | | 2/2002 | Dell et al. .................... | 711/170 |
| 6,356,105 B1 | * | 3/2002 | Volk ............................. | 326/30 |
| 6,356,106 B1 | | 3/2002 | Greeff et al. ................. | 326/30 |
| 6,460,125 B2 | * | 10/2002 | Lee et al. .................... | 711/167 |
| 6,466,472 B1 | * | 10/2002 | Lin ............................. | 365/63 |
| 6,510,100 B2 | * | 1/2003 | Grundon et al. ............. | 365/233 |
| 6,559,825 B2 | * | 5/2003 | Jacobsen et al. ............. | 345/102 |
| 6,621,496 B1 | * | 9/2003 | Ryan ........................... | 345/533 |
| 6,621,760 B1 | * | 9/2003 | Ahmad et al. ............... | 365/233 |
| 2002/0017939 A1 | * | 2/2002 | Okuda et al. ................ | 327/296 |
| 2002/0144166 A1 | * | 10/2002 | Chang et al. ................ | 713/320 |
| 2003/0115494 A1 | * | 6/2003 | Cervantes .................... | 713/322 |

* cited by examiner

Primary Examiner—Ulka J. Chauhan
(74) Attorney, Agent, or Firm—Hamilton & Terrile, LLP; Robert W. Holland

(57) ABSTRACT

A system and method for managing power consumption of an information handling system dynamically switches between high and low clock speed data transfers with double data rate (DDR) memory. The selection of a high clock speed dynamically switches the DDR memory to connect to a parallel termination for more rapid data transfers with increased power consumption. The selection of a low clock speed dynamically switches the DDR memory to disconnect the parallel termination for slower data transfers with reduced power consumption. In one embodiment, portable computer graphics DDR memory reduces power consumption by selecting low clock speed transfers without parallel termination when operating on internal power. The portable computer graphics DDR memory provides improved display resolution by selecting high clock speed transfers with parallel termination when operating on external power or when displaying information from high resolution applications.

19 Claims, 2 Drawing Sheets

US 6,894,691 B2

DYNAMIC SWITCHING OF PARALLEL TERMINATION FOR POWER MANAGEMENT WITH DDR MEMORY

BACKGROUND OF THE INVENTION

1. Field of the Invention

The present invention relates in general to the field of information handling systems, and more particularly to information handling system power management.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Recent improvements in memory devices have resulted in improved data storage and transfer within information handling systems. For instance, double data rate (DDR) memory devices transfer data on both edges of a clock signal to increase the amount of data that is sent along a memory bus. More rapid data transfers with memory devices allow processors and other devices to use data more quickly, dramatically improving computing speeds. However, DDR memory's more rapid data transfers also result in increased bus noise that degrades data signals, such as transmission reflections that tend to increase signal cross talk. In order to compensate for this increased signal interference, DDR memory uses parallel termination for high data transfer rates. Parallel termination cancels transmission reflections to reduce data signal degradation but also results in increased power consumption.

One difficulty with the use of DDR memory occurs with information handling systems that operate with an internal power source. For instance, portable computers typically operate with an internal battery power source that needs recharging after a limited duration. Once a portable computer discharges its battery, it may operate with an external power source that also recharges the battery. When a portable computer operates on an internal power supply of limited duration, DDR memory in use on the portable computer places a greater draw on the battery if parallel termination is used, resulting in decreased battery life. However, if parallel termination is not used, the DDR memory generally cannot transfer data at high clock speeds, making the extra expense of installing DDR memory thus essentially a waste.

SUMMARY OF THE INVENTION

Therefore a need has arisen for a system and method which dynamically switches memory to connect or disconnect with a parallel termination to manage power consumption in balance with system performance.

A further need exists for a system and method which improves internal power source duration of portable computers that use DDR memory.

In accordance with the present invention, a system and method are provided which substantially reduces the problems and difficulties associated with the use of DDR memory in information handling systems that have internal power sources of limited duration. The DDR memory connection with a parallel termination is selectively connected and disconnected to manage information handling system power consumption. Parallel termination of the DDR memory is disconnected to reduce power consumption when the information handling system operates on an internal power source. Parallel termination of the DDR memory is connected to improve performance when the information handling system operates on an external power source. Parallel termination of the DDR memory is also connected to improve performance when the information handling system operates on an internal power source but runs a predetermined application associated with a need for high speed memory performance.

More specifically, in one embodiment, a DDR memory device supports a graphics controller in the generation of display signals. The graphics controller selectively transfers data with the graphics DDR memory at either a high clock speed or a low clock speed. When the graphics controller operates at a high clock speed, the DDR memory is connected to a parallel termination. When the graphics controller operates at a low clock speed, the DDR memory is disconnected from the parallel termination, thus reducing power consumption. Parallel termination is dynamically switched on and off to adjust for changes in the operation of the information handling system, such as connecting or disconnecting an external power source or running or ceasing operation of a high bandwidth application.

A power consumption manager controls power consumption by determining whether to operate graphics DDR memory at a high clock speed with parallel termination and the associated increased power use or to operate graphics DDR memory at a low clock speed without parallel termination to achieve power consumption savings. For instance, the power consumption manager commands high speed graphics DDR memory operation if the information handling system is operating on external power. This allows high bandwidth data transfers, such as are used with high resolution graphics, during operations in which power consumption is of reduced importance. The power consumption manager commands low speed graphics DDR memory operation if the information handling system is operating on internal power.

Low speed DDR memory operations allows the display of information with reduced bandwidth and resolution to provide reduced power consumption during operations in which power consumption is of increased importance. In many instances, low speed graphics DDR memory operation will have a negligible effect on the display image. However, in some instances, high bandwidth and resolution displays are desired for certain images or applications. The power consumption manager commands high speed graphics DDR memory operation when the information handling system is operating on an internal power source for predetermined high bandwidth applications, such as applications that display high resolution images. Thus, power consumption management is balanced with display resolution demands where high resolution displays are desired.

The present invention provides a number of important technical advantages. One example of an important technical advantage is that high clock speed operation of graphics DDR memory is provided with minimal impact on power consumption. High clock speed operations and parallel termination with increased power consumption are used when power is supplied by an external power source or when a high bandwidth application is used and power is supplied by an internal power source. Low clock speed operations without parallel termination with reduced power consumption are used when power is supplied by an internal power source and high bandwidth applications are not running. For instance, portable computers with high resolution displays are supported with powerful DDR memory capability when power consumption is less of a concern, such as when external power is used, and when high resolution graphics are called for with applications, such as games, photo editors or drawing applications. Power consumption is reduced when an internal power source of limited duration is used with minimal impact on display quality where display images do not demand high resolution quality.

Another example of an important technical advantage is that power consumption management is provided with dynamic switching of parallel termination on and off as needed to support high or low clock speed DDR memory operation. Dynamic switching is commanded by the power consumption manager automatically in response to changes in the operational state of an information handling system, such as changes between internal and external power sources or changes to the applications running on the information handling system. Dynamic switching is invisible to the user with minimal impact on display quality.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Double data rate memory (DDR) provides rapid data transfers. However, when DDR operates at high clock speeds for rapid data transfer, parallel termination is generally used to reduce transmission reflections, resulting in increased power use. Information handling systems that rely on internal power sources of limited duration, such as batteries, will have reduced operating times when operating DDR memory at high clock speeds. To manage information handling system power consumption, DDR memory operating speed is selectable between high speed operation with parallel termination and increased power use and low speed operation without parallel termination for decreased power use. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
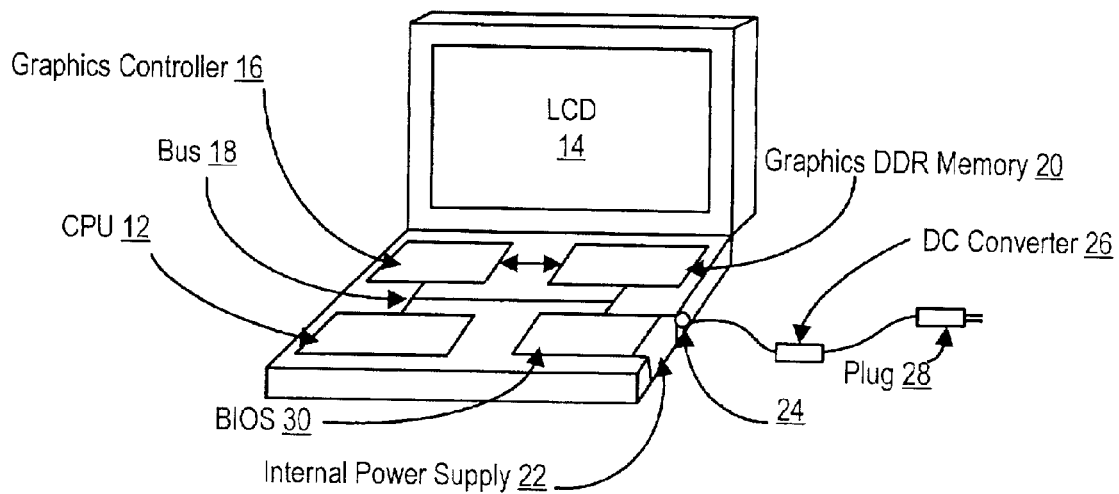
FIG. 1 depicts a cutaway view of an information handling system configured as a portable computer with graphics memory power consumption management.

In one embodiment, high and low speed DDR graphics memory operations are selected to manage power consumption of a portable computer when operating on internal or external power sources or running high bandwidth applications. Referring now to FIG. 1, a cutaway view of a portable computer information handling system 10 is depicted. A CPU 12 runs software applications that generate information for display on a liquid crystal display (LCD) 14. Information for display is transferred from CPU 12 to a graphics controller 16 through a bus 18. Graphics controller 16 generates display signals to display the information on LCD 14. Graphics memory 20 is DDR memory interfaced with graphics controller 16. DDR memory aids in the generation of display signals by storing information for use by graphics controller 16. Portable computer 10 operates on either internal power from an internal power source 22, such as a battery, or external power supplied through an external power adapter 24. For instance, external power is supplied by a direct current wire that plugs into adapter 24 with an external DC current provided by an AC/DC converter 26 that converts alternating current received through an electric plug 28. Internal power source 22 provides power for a limited duration and is re-charged by power received from external power adapter 24. A BIOS 30 manages hardware devices of portable computer 10.

Graphics DDR memory 20 selectively operates at either a high clock speed or a low clock speed to manage power consumption by portable computer 10. In high speed operation, graphics memory 20 connects to a parallel termination so that data is effectively transferred without undue interference from transmission reflections. High speed operation allows graphics controller 16 to process display information in a more rapid manner with high bandwidth, such as is needed to display high resolution graphics. However, parallel termination increases the power usage, thus decreasing the duration of internal power source 22. In low speed operation, graphics memory 20 is disconnected from parallel termination resulting in a decrease of power usage. The low speed data transfer rates do not require parallel termination since the lower data transmission rates do not suffer from transmission reflection interference.

Selection of either the high or low clock speed operation of graphics DDR memory 20 is made based in part upon the power supply providing power to portable computer 10 and software applications running on portable computer 10. For instance, if portable computer 10 is operating on internal power, low speed DDR operation is selected and parallel termination of graphics memory 20 is disconnected, resulting in reduced power consumption. If portable computer 10 is operating on external power, high speed operation is selected with parallel termination of graphics DDR memory 20 connected to provide high resolution graphics. If portable computer 10 is operating on internal power but running an application or displaying an image having high display resolution, then high speed DDR operation is selected with parallel termination. Operating DDR memory with parallel termination on an internal power source results in reduced duration of the internal power source, however, reduced operating duration is accepted as a tradeoff to have high resolution graphics supported by high bandwidth memory operations when needed by a user.

Figure 2:
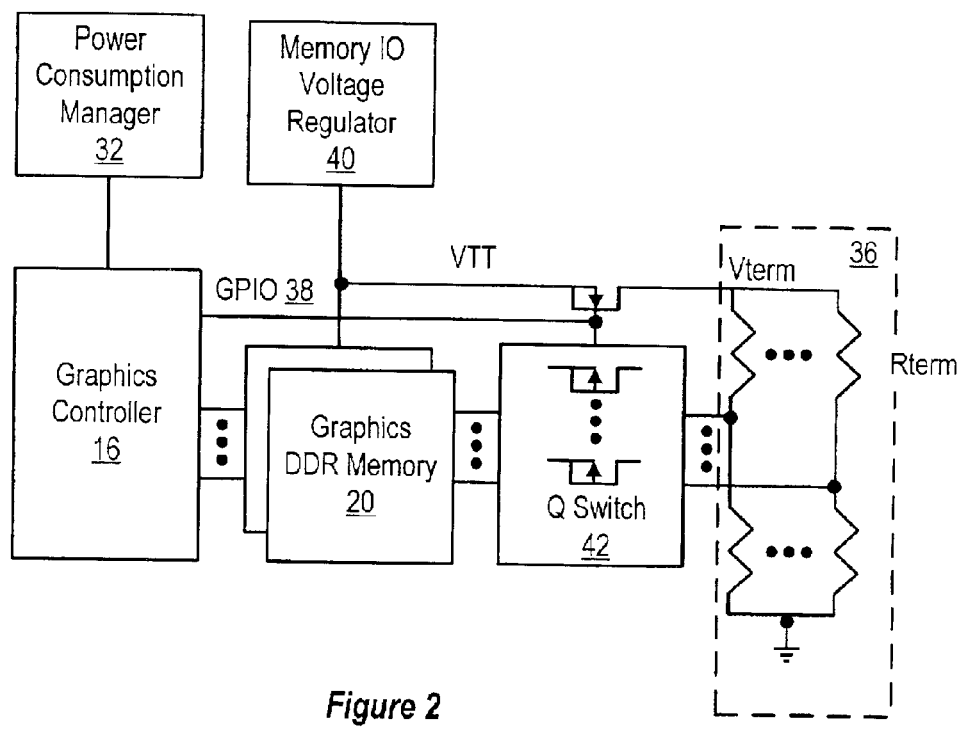
FIG. 2 depicts a block diagram of a graphics memory power consumption management system.

Referring now to FIG. 2, a block diagram depicts a system for power management of an information handling system by dynamic selection of graphics DDR memory operating speed. A power consumption manager 32 determines whether high or low speed operation of graphics DDR memory 20 is desired and commands the determined operation speed through graphics controller 16. Power consumption manager 32 is, for instance, a software module running on BIOS 30 or graphics controller 16 that detects the power supply in use by portable computer 10 and the resolution of the display information of the application or applications that are displaying information through LCD 14. In one embodiment, power consumption manager 32 operates as a state machine that responds to changes of the state of the power source powering portable computer 10 and the applications running on portable computer 10 with changes in state communicated by the operating system running on CPU 12 of portable computer 10.

Power consumption manager 32 determines the power source in use by portable computer 10 by, for instance, querying BIOS 30 or the operating system running on CPU 12. If portable computer 10 initiates operation on internal power, power consumption manager 32 command low speed operation of graphics memory 20. If portable computer 10 initiates operation on external power, power consumption manager 32 commands high speed operation of graphics memory 20 to improve the resolution of displayed graphics. If portable computer 10 initiates operation on internal power, power consumption manager 32 commands low speed operation of graphics memory 20 to decrease power consumption. However, high speed operation of graphics memory 20 is selectable when portable computer 10 is operating on internal power to display high resolution graphics, thus trading off the duration of operations on internal power to obtain high resolution graphics when desired to display high resolution information.

Power consumption manager 32 determines whether display information is high or low resolution by, for instance, determining the application running on CPU 12 that is communicating display information to LCD 14 or determining the type and quantity of information generated by graphics controller 16. For instance, the operating system running on CPU 12 includes a list of applications that use high bandwidth for high resolution graphics and communicates to power consumption manager 32 when an application on the list begins or stops the display of information. If a high bandwidth application initiates the display of information and portable computer 10 is operating on internal power, power consumption manager 32 commands high speed operation of graphics memory 20 to display the information with high resolution. Once the high bandwidth application stops the display of information, if portable computer 10 is operating on internal power, power consumption manager 32 commands low speed operation of graphics memory 20 to reduce power consumption.

Graphics controller 16 transfers graphics data with graphics DDR memory 20 through a graphics memory bus 34 at either a high or low clock speed. When a high clock speed is selected, graphics controller 16 commands a connection of graphics DDR memory 20 with a parallel termination 36, such as by sending a signal through the general purpose input/output (GPIO) line 38. A memory input/output voltage regulator 40 provides a reference voltage to graphics DDR memory 20 and termination voltage Vterm to parallel termination 36. A high speed selection signal from graphics controller 16 closes Qswitch 42, connecting termination lines 44 from graphics DDR memory 20 with parallel termination 36, thus reducing transmission reflections to support high clock speed data transfers between graphics controller 16 and graphics DDR memory 20.

The use of parallel termination supports high speed clock signals but also increases power consumption. When a low clock speed is selected for data transfers between graphics controller 16 and graphics DDR memory 20, parallel termination is no longer necessary. Graphics controller 16 sends a low clock speed selection signal through GPIO line 38 to open Qswitch 42, thus disconnecting termination lines 44 from parallel termination 36. Disconnecting parallel termination 36 reduces power consumption without affecting data transfers at the low clock speed.

Figure 3:
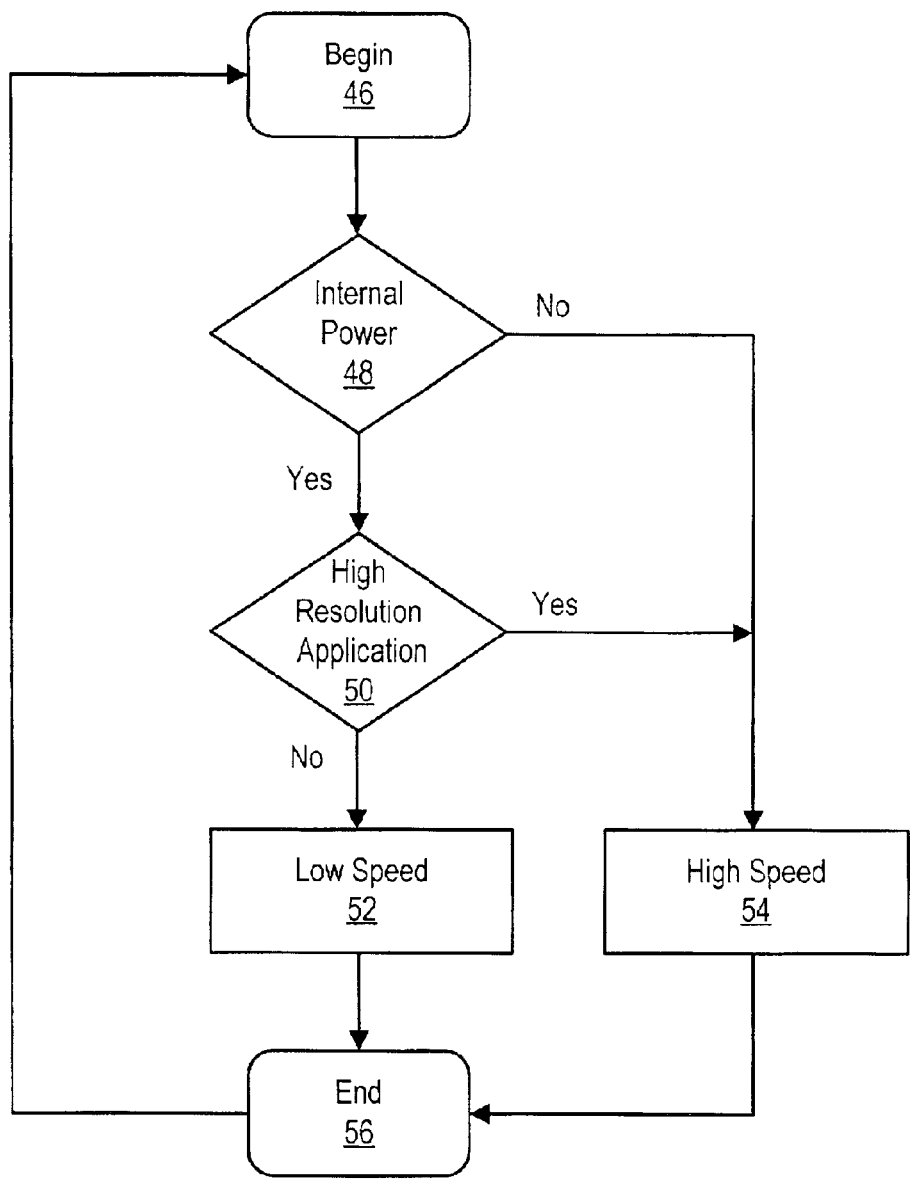
FIG. 3 depicts a flow diagram for management of graphics memory power consumption.

Referring now to FIG. 3, a flow diagram depicts the process performed by power consumption manager 32 to determine whether to connect or disconnect graphics DDR memory 20 and parallel termination 36. The process begins at step 46 based on, for instance, a periodic timer or a signal to power consumption manager 32 that portable computer 10 has changed its status, such as with a change in applications running on CPU 12 or a change in power source detected by BIOS 30. At step 48, power consumption manager 32 determines if portable computer 10 is operating on internal power. If not, or if a separate determination finds that portable computer 10 is operating on external power, then the process proceeds to step 54 for a command that graphics DDR memory 20 operate at high speed. If yes, then the process proceeds to step 50 for power consumption manager 32 to determine if a high bandwidth application is running on portable computer 10. For instance, computer games, photo editors and drawing programs are some examples of applications that use high resolution images. If a high bandwidth application is running, the process proceeds to step 54 to command high speed operation of graphics DDR memory 20. If a high bandwidth application is not running, the process proceeds to step 52 to command low speed operation of graphics DDR memory 20, resulting in reduced power consumption. Once low or high speed operation of graphics DDR memory 20 is selected at either step 52 or step 54, the process ends at step 56 until called again at step 46 by a timer or change in status of portable computer 10.

The graphics DDR memory embodiment illustrates one example of power consumption management through the connection and disconnection of parallel termination for DDR memory based on the power supply or bandwidth demands of an information handling system. In alternative embodiments, power consumption management is provided by connecting or disconnecting parallel termination for DDR memory associated with other components of an information handling system. Low clock speed DDR memory operations are selected to conserve power when an internal power supply is used and high clock speed DDR memory operations are selected to support high bandwidth applications for one or more information handling system components. Dynamic switching of parallel termination on to support high bandwidth applications and off to conserve power manages power consumption and performance needs.

Although the present invention has been described in detail, it should be understood that various changes, substitutions and alterations can be made hereto without departing from the spirit and scope of the invention as defined by the appended claims.

What is claimed is:

1. A system for managing power consumption in the display of information with internal or external power, the system comprising:

a graphics controller operable to generate first and second display information signals;

a memory device interfaced with the graphics controller, the memory device supporting the generation of the first display information signals by the graphics controller at a first clock speed having a first power consumption level with parallel termination and the second display information signals at a second clock speed having a second power consumption level without parallel termination;

a power consumption manager interfaced with the memory device and operable to switch on parallel termination for display of the information on external power, switch on parallel termination for display of the first display information signals on internal power, and to switch off parallel termination for display of the second display information signals on internal power.

2. The system of claim 1 wherein the internal power source is a battery.

3. The system of claim 1 wherein the first display information is generated by one or more predetermined applications.

4. The system of claim 3 wherein the one or more predetermined applications are high bandwidth display information applications.

5. The system of claim 1 wherein the external power source comprises an alternating current power source.

6. The system of claim 1 wherein the memory device comprises a double data rate memory device.

7. The system of claim 1 wherein the graphics controller comprises a portable computer graphics controller operable to display information through a liquid crystal display.

8. A method for managing power consumption of an information handling system, the method comprising:

determining whether power to the information handling system is supplied by an internal or external power supply;

switching on parallel termination of the graphics controller memory if power is supplied by an external power supply;

switching off parallel termination of the graphics controller memory if power is supplied by an internal power supply; and switching on parallel termination of the graphics controller memory if power is supplied by an internal power supply and the information handling system is displaying information with a high bandwidth application.

9. The method of claim 8 wherein the information handling system comprises a portable computer.

10. The method of claim 9 wherein the graphics memory comprises double data rate memory having a high and low clock speed, the double data rate memory using parallel termination to operate at the high clock speed.

11. The method of claim 9 wherein the internal power source comprises a battery.

12. The method of claim 9 wherein the external power source comprises an alternating current power source.

13. The method of claim 8 wherein switching on parallel termination further comprises:

sending an on signal from the graphics controller general purpose input/output to a Qswitch; and activating the Qswitch to interface the graphics memory to the parallel termination.

14. The method of claim 8 wherein switching off parallel termination further comprises:

sending an off signal from the graphics controller general purpose input/output to a Qswitch, and activating the Qswitch to remove the interface of the graphics memory to the parallel termination.

15. An information handling system comprising:

a central processing unit operable to run applications;

memory interfaced with the central processing unit and operable to communicate information at high and low clock speeds;

a parallel termination interfaced with the memory;

a switch interfaced with the parallel termination and operable to connect or disconnect the memory and the parallel termination;

an internal power source operable to power the memory;

an external power adapter operable to accept external power to power the memory;

a power consumption manager operable to command the switch to connect the parallel termination if the central processing unit runs an application associated with high speed memory communication of information and to disconnect the parallel termination if the central processing unit runs an application associated with low speed memory communication of information during operation with the internal power source.

16. The information handling system of claim 15 further configured as a portable computer.

17. The information handling system of claim 15 wherein the application associated with high speed memory communication of information comprises a high bandwidth graphics application.

18. The information handling system of claim 15 wherein the memory comprises double data rate memory.

19. The information handling system of claim 15 wherein the memory comprises graphics memory and the power consumption manager switches on parallel termination to communicate high bandwidth display information at the high speed.

* * * * *